(12) United States Patent
Chen

(10) Patent No.: US 12,395,484 B1
(45) Date of Patent: Aug. 19, 2025

(54) METHOD AND APPARATUS FOR ACCESS CONTROL OF SERVICE RESOURCES, ELECTRONIC DEVICE, AND STORAGE MEDIUM

(71) Applicant: Beijing Volcano Engine Technology Co., Ltd., Beijing (CN)

(72) Inventor: Jiaqi Chen, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/074,213

(22) Filed: Mar. 7, 2025

(30) Foreign Application Priority Data

Jun. 17, 2024 (CN) .......................... 202410780636.6

(51) Int. Cl.
*G06F 21/00* (2013.01)
*H04L 9/40* (2022.01)
*H04L 41/0813* (2022.01)
*G06F 21/30* (2013.01)
*G06F 21/31* (2013.01)

(52) U.S. Cl.
CPC ........ *H04L 63/083* (2013.01); *H04L 41/0813* (2013.01); *H04L 63/20* (2013.01); *G06F 21/30* (2013.01); *G06F 21/305* (2013.01); *G06F 21/31* (2013.01); *H04L 63/00* (2013.01)

(58) Field of Classification Search
CPC ... H04L 63/083; H04L 63/20; H04L 41/0813; H04L 63/00; G06F 21/30; G06F 21/31; G06F 21/305
See application file for complete search history.

(56) References Cited

U.S. PATENT DOCUMENTS

2024/0314562 A1* 9/2024 Suzuki .................... G06F 21/33

FOREIGN PATENT DOCUMENTS

| CN | 114615328 A | 6/2022 |
| CN | 115208579 A | 10/2022 |

(Continued)

OTHER PUBLICATIONS

"Make Resource Invisible with Single Packet Authorization"—Appgate Cybersecurity, Feb. 23, 2021 https://www.appgate.com/blog/make-resources-invisible-with-single-packet-authorization (Year: 2021).*

(Continued)

*Primary Examiner* — Randy A Scott
(74) *Attorney, Agent, or Firm* — Astute IP Law Group

(57) ABSTRACT

The present disclosure relates to a field of network security technologies and discloses a method and an apparatus for access control of service resources, an electronic device and a storage medium. The method includes: displaying a first page of a target application in response to an access request for the first page initiated through a specific address, wherein the first page includes a verification control, and the specific address of the first page includes a random path generated randomly; receiving an authorization code input in the verification control, and displaying a login page of the target application in response to the authorization code being successfully authenticated; and receiving authentication information input in the login page, and displaying a page of related service resources of the target application in response to the authentication information being successfully authenticated.

20 Claims, 5 Drawing Sheets

(56) References Cited

FOREIGN PATENT DOCUMENTS

| CN | 115603958 A | 1/2023 |
| CN | 116800484 A | 9/2023 |
| CN | 117055991 A * | 11/2023 |

OTHER PUBLICATIONS

"Zero Trust Security Single Packet Authorization"—Matt Conran, Network-Insight, Jun. 18, 2019 https://network-insight.net/2019/06/18/zero-trust-single-packet-authorization-passive-authorization/ (Year: 2019).*

Notice of Allowance for Chinese Patent Application No. 202410780636.6, mailed on Sep. 9, 2024, 6 pages.

Office Action for Chinese Patent Application No. 202410780636.6, mailed on Aug. 31, 2024, 13 pages.

* cited by examiner

METHOD AND APPARATUS FOR ACCESS CONTROL OF SERVICE RESOURCES, ELECTRONIC DEVICE, AND STORAGE MEDIUM

CROSS-REFERENCE TO RELATED APPLICATION(S)

This application claims priority to Chinese Application No. 202410780636.6 filed on Jun. 17, 2024, the disclosure of which is incorporated herein by reference in its entirety.

FIELD

The present disclosure relates to a field of network security technologies and, in particular, to a method and an apparatus for access control of service resources, an electronic device and a storage medium.

BACKGROUND

Cyberattackers usually perform a scanning operation to detect a weakness or vulnerability of an application, so as to launch an attack on the detected weakness or vulnerability subsequently.

At present, a single packet authorization (SPA) technology can be adopted to effectively avoid the scanning operation of the cyberattacker. When a client attempts to establish a connection with a server of an application, the SPA technology requires the client to send a specially constructed authentication data package to the server. The server performs authority verification on the authentication data package, and only after the verification is successful, a port or a service is opened for the client.

SUMMARY

In view of this, embodiments of the present disclosure provide a method and an apparatus for access control of service resources, an electronic device and a storage medium.

In one aspect, the present disclosure provides a method for access control of service resources, including: displaying a first page of a target application in response to an access request for the first page initiated through a specific address, where the first page includes a verification control, and the specific address of the first page includes a random path generated randomly; receiving an authorization code input in the verification control, and displaying a login page of the target application in response to the authorization code being successfully authenticated; and receiving authentication information input in the login page, and displaying a page of related service resources of the target application in response to the authentication information being successfully authenticated.

In another aspect, the present disclosure further provides service resources access control apparatus, including: a first page display unit, configured to display a first page of a target application in response to an access request for the first page initiated through a specific address, where the first page includes a verification control, and the specific address of the first page includes a random path generated randomly; a login page display unit, configured to receive an authorization code input in the verification control, and display a login page of the target application in response to the authorization code being successfully authenticated; and a page resource display unit, configured to receive authentication information input in the login page, and display a page of related service resources of the target application in response to the authentication information being successfully authenticated.

In another aspect, the present disclosure further provides an electronic device, including a processor and a memory, wherein the memory is configured to store a computer program, and the computer program, when executed by the processor, implements the method according to the above.

In another aspect, the present disclosure further provides a computer-readable storage medium, configured to store a computer program, wherein the computer program, when executed by a processor, implements the method according to the above.

BRIEF DESCRIPTION OF THE DRAWINGS

The features and advantages of the present disclosure will be more clearly understood by referring to the drawings, which are illustrative and not to be construed as limiting the present disclosure, and in which.

DETAILED DESCRIPTION OF EMBODIMENTS

Figure 1:
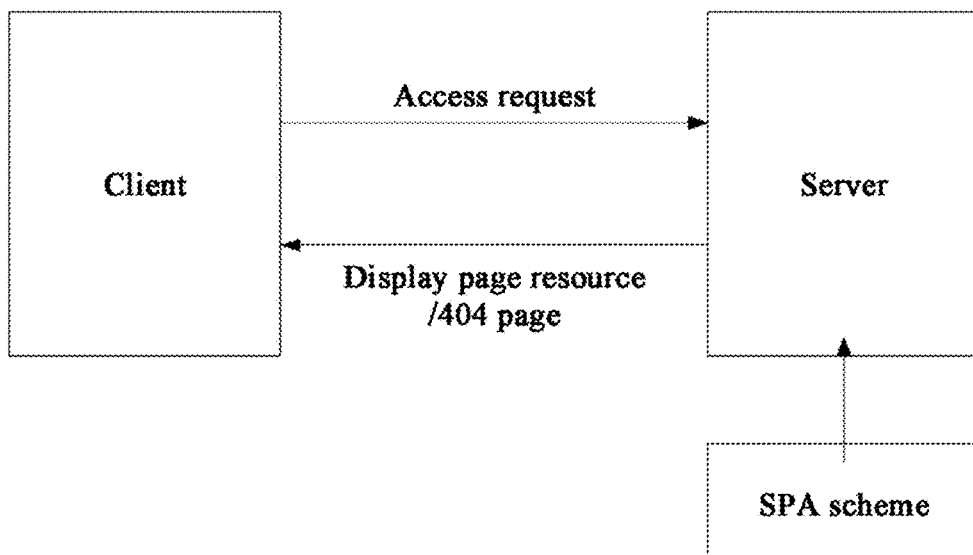
FIG. 1 is a schematic diagram of a network architecture of a method for access control of service resources according to an embodiment of the present disclosure.

The embodiments of the present disclosure will be described in more detail below with reference to the drawings. Although some embodiments of the present disclosure are shown in the drawings, it should be understood that the present disclosure can be implemented in various forms and should not be interpreted as being limited to the embodiments set forth herein. On the contrary, these embodiments are provided for a thorough and complete understanding of the present disclosure. It should be understood that the drawings and embodiments of the present disclosure are only for illustrative purposes and are not intended to limit the protection scope of the present disclosure.

In the description of the embodiments of the present disclosure, the term "include/comprise" and similar terms should be understood as open inclusion, that is, "include/comprise but not limited to". The term "based on" should be understood as "based at least partially on". The term "one embodiment" or "the embodiment" should be understood as "at least one embodiment". The term "some embodiments"

should be understood as "at least some embodiments". Other explicit and implicit definitions may be included below.

In this document, unless explicitly stated, performing a step "in response to A" does not mean that the step is performed immediately after "A", but may include one or more intermediate steps.

It should be understood that the data involved in this technical solution (including but not limited to the data itself, the acquisition, use, storage or deletion of the data) should comply with the requirements of corresponding laws, regulations and related provisions.

It should be understood that, before using the technical solutions disclosed in the embodiments of the present disclosure, the related user should be informed of the type, usage scope, usage scenario, etc. of the information involved in the present disclosure and obtain the authorization from the related user through appropriate means according to relevant laws and regulations, where the related user may include any type of right subject, such as an individual, an enterprise, a group.

For example, in response to receiving an active request from a user, prompt information is sent to the related user to explicitly prompt the related user that the operation requested to be performed will need to obtain and use the information of the related user, so that the related user can independently select whether to provide information to software or hardware such as an electronic device, an application, a server or a storage medium that performs the operation of the technical solution of the present disclosure according to the prompt information.

As an optional but non-restrictive implementation, the manner of sending the prompt information to the related user in response to receiving the active request from the related user may be, for example, a pop-up window, and the prompt information may be presented in the form of text in the pop-up window. In addition, the pop-up window may also carry a selection control for the user to select "agree" or "disagree" to provide information to the electronic device.

It should be understood that the above process of notification and obtaining user authorization is only illustrative and does not limit the implementation of the present disclosure, and other manners that meet relevant laws and regulations may also be applied to the implementation of the present disclosure.

Office security usually involves security management of network, identity and terminal. By implementing the networking of private network, access control, management of terminals in private network and information security protection, the digital office can be made safer, more efficient and easier to use. Security management at the network level can ensure that private networks such as office networks can operate safely and efficiently, and thus ensure that service data can be transmitted and stored safely. Security management at the identity level can improve the efficiency and security of identity authentication for users to access the private network. Security management at the terminal level can realize unified management of terminal devices in the private network, data leakage prevention and terminal threat protection, so as to ensure the security of enterprise data.

In practical applications, security management of network, identity and terminal can realize technical association in multiple technical branches such as networking policy, network admission and control, remote access, unified terminal management, terminal detection and response, enterprise data leakage prevention and identity authentication management, so as to make digital office simpler, more efficient and easier to implement.

SPA is a security technology used to reduce scanning risks. Before attempting to establish a connection, a specially constructed authentication package is sent to the server. The authentication package contains sufficient information for the server to verify the client, so as to determine whether the client that initiates the request has permission to access a specified service or resource. Only after the verification is successful, the server will open a port or service and allow the client to establish a formal connection. Related technologies usually adopt a four-layer single packet authorization scheme for implementation. This scheme requires users to install a specific software or tool to specially construct a TCP or UDP four-layer data package to request access to network services. For enterprises, the software tool has problems of compatibility with operating systems or network devices, and may increase the management cost of software maintenance for enterprises. On the other hand, the software and tool relied on by SPA implementation may contain technical defects or undiscovered vulnerabilities, and these vulnerabilities may be exploited by attackers to bypass the SPA mechanism. For enterprise employees, they also need to download and install relevant clients, which may be cumbersome to operate and reduce the implementation and promotion of security solutions within the enterprise.

To be simple, the existing SPA technology requires a specific software or tool to be installed on a device to construct the authentication data package. On one hand, maintenance costs need to be invested in the software or tool, and on the other hand, there may be technical defects or potential vulnerabilities that may be exploited by the cyberattacker. Therefore, a safer and more efficient application protection method is needed at present.

Based on this, the present disclosure provides a method for access control of service resources, which is applied to a server and can be applied to enterprise office. Deploying a seven-layer SPA scheme on the server can achieve the concealment effect of the Web application without installing any software, improve the security of the process of obtaining service resources, and at the same time can also achieve the effect of being unable to be scanned and avoid being attacked.

In the technical solution of some embodiments of the present disclosure, a first page may be set for the target application, and after authentication is completed on the first page, service resources of the target application can be accessed. A specific address of the first page includes a random path generated randomly, and usually only employees within the enterprise can know the specific address. After accessing the first page, the authorization code needs to be authenticated on the first page before the login page of the target application can be accessed. Generally, only employees within the enterprise can obtain the authorization code. In this way, based on dual authentication of the specific address of the first page and the authorization code, it can be ensured that the service resource of the target application can only be accessed by employees with permission and within the enterprise. A cyberattacker cannot establish an effective connection with the server of the target application due to lack of knowledge of the specific address of the first page and the authorization code, and thus cannot perform scanning operation on the server of the target application. The technical solution of the present disclosure can be implemented based on page technologies without installing specific software or tools, so that the application can be protected safely and efficiently.

Referring to FIG. 1, FIG. 1 is a schematic diagram of a network architecture of a method for access control of service resources according to an embodiment of the present disclosure. The resource refers to content that is stored and transmitted in a digital manner and can be accessed through the network, such as an audio and video file, a picture, and a text. The client is installed on the terminal device, the server is deployed on the server device, and the SPA scheme is deployed on the server. Based on the SPA scheme, a resource of the target application can be hidden according to the administrator's settings. A first page corresponding to the hidden target application will be generated. When the hidden resource is required to be accessed, the client needs to access the first page and perform verification on the first page. When the verification is successful, a page of related service resources is displayed on the display device of the client. When the verification fails, a 404 page is displayed, indicating that the client cannot access the hidden resource.

According to the embodiments of the present disclosure, an embodiment of a method for access control of service resources is provided. It should be noted that the steps shown in the flowcharts of the drawings may be performed in a computer system such as a set of computer-executable instructions, and although a logical order is shown in the flowcharts, in some cases, the steps shown or described may be performed in an order different from that here.

Figure 2:
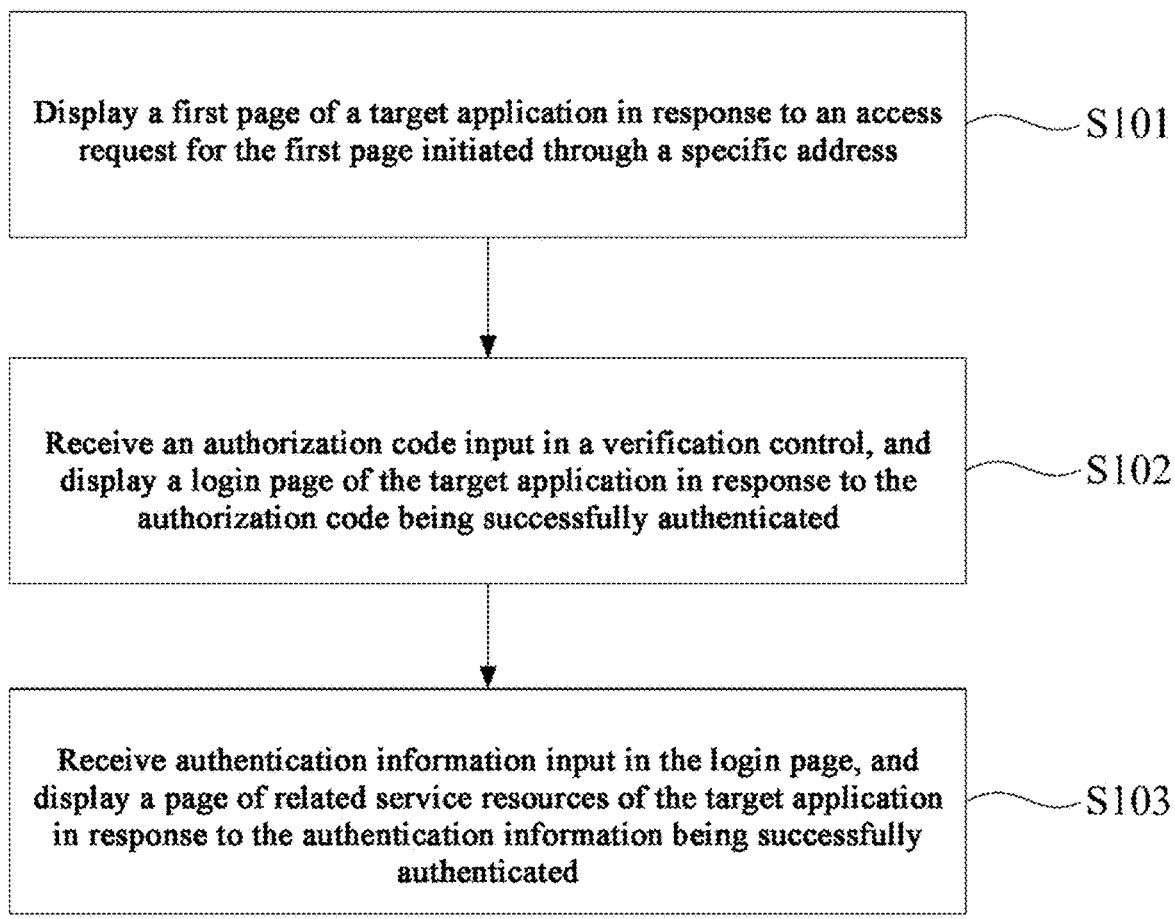
FIG. 2 is a schematic flowchart of a method for access control of service resources according to an embodiment of the present disclosure.

In this embodiment, a method for access control of service resources is provided, which is applied to a client. FIG. 2 is a flowchart of a method for access control of service resources according to an embodiment of the present disclosure. As shown in FIG. 2, the process includes the following steps.

In S101, a first page is displayed in response to an access request for the first page of a target application initiated through a specific address.

The first page includes a verification control, and the specific address includes a random path generated randomly.

The target application refers to a Web application that enables a service concealment function according to actual requirements. The application with the concealment function enabled is not directly accessible by default, and a corresponding first page and authorization code will be generated based on a seven-layer application concealment scheme deployed on the server. The specific address is private, and the specific address of the first page and the authorization code can be issued to a specific group of people. The first page is equivalent to an exclusive knock page of the application with the concealment function enabled, and all pages outside the first page, including static resources, cannot be accessed without authorization. The style of the first page is domain/sc/random path, where the random path is randomly generated, and domain/sc may be the domain name of the target application.

When the target application needs to be accessed and the target application is set to the concealment state, if the user of the client is issued the authorization code and a first page link (i.e. the specific address) of the target application, the user can directly initiate an access request for the first page of the target application, and the first page is displayed on the display device of the client. The first page is provided with the verification control, and the verification control may be in the form of a text input box for inputting the authorization code.

In S102, an authorization code input in the verification control is received, and a login page of the target application is displayed in response to the authorization code being successfully authenticated.

The user of the client inputs the authorization code in the verification control, and the authorization code corresponds to the first page. After receiving the input authorization code, the server verifies it. After the verification is successful, the client receives data indicating that the verification is successful, and displays the login page of the target application on the display device of the client. The login page is the login page of the target application.

If the input authorization code cannot be verified, the client cannot receive the related data of the target application, and cannot display the login page of the target application.

In S103, authentication information input in the login page is received, and a page of related service resources of the target application is displayed in response to the authentication information being successfully authenticated.

The user of the client can input the authentication information in the login page of the target application, and the authentication information may include a user name, a password, a verification code, etc. After inputting the authentication information in the login page, the user clicks a control representing submission, and the server receives the authentication information and performs authentication. When the authentication is successful, the page of the related service resources of the target application is displayed on the client side.

Figure 3:
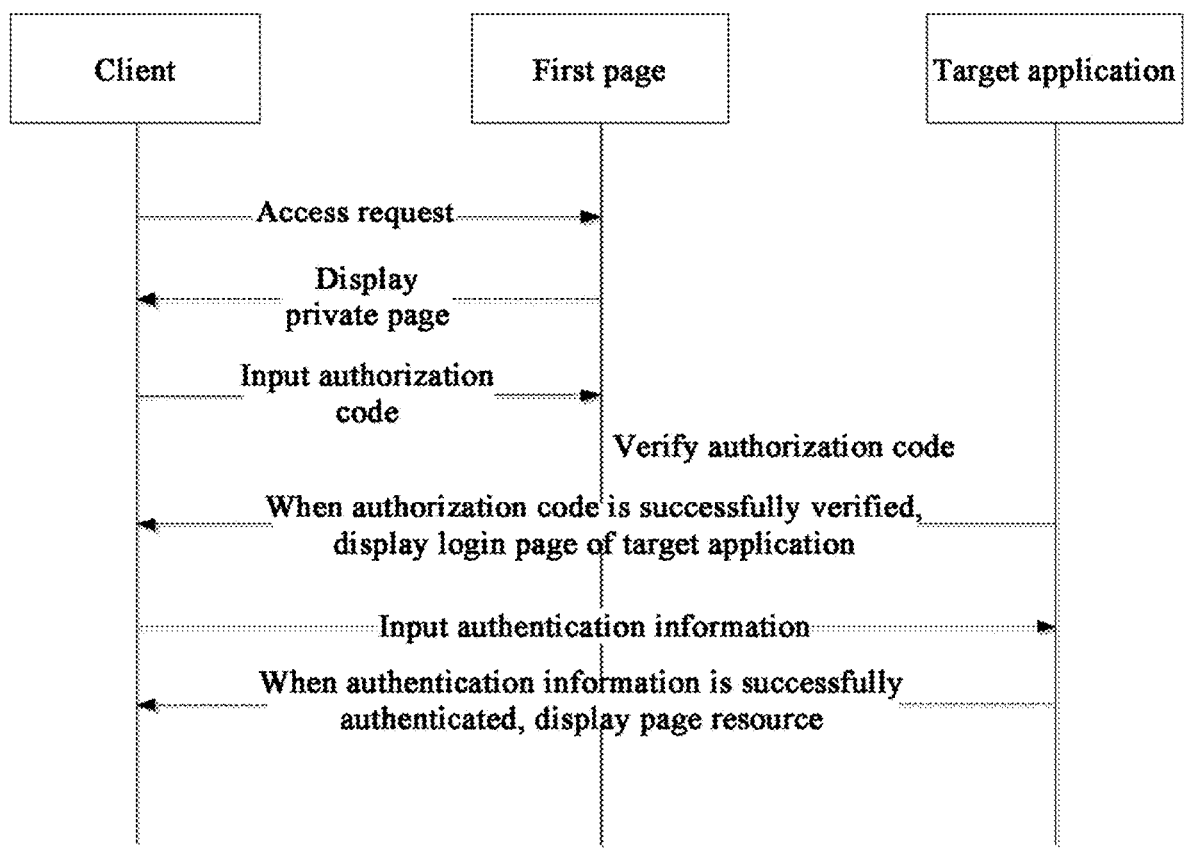
FIG. 3 is a schematic diagram of a scenario of a method for access control of service resources according to an embodiment of the present disclosure.

In the method for access control of service resources provided in this embodiment, when the access request for the first page of the target application is received, the first page is displayed, the authorization code input in the first page is verified, and when the verification is successful, the login page of the target application is displayed for the user to input the authentication information and the authentication information is authenticated. When the authentication is successful, the page of the related service resources of the target application is displayed. This scenario is shown in FIG. 3. In this method, for the target application that needs authentication, the concealment function can be directly enabled to generate the corresponding first page. Only the user who inputs the authorization code in the first page and passes the verification can normally access the login page of the target application for login. The concealment of the Web application can be completed without installing the client, so as to achieve the effect of being unable to be scanned and attacked, and the service resource can be protected safely and efficiently.

In some optional embodiments, the service resource access method further includes the following step.

S21: initiating a resource access request for the target application in response to no access request for the first page being initiated or the authorization code failing to be authenticated, and displaying a prompt page representing that the service resources cannot be provided in response to the resource access request.

The target application in this embodiment refers to an application with the concealment function enabled, which is not accessible by default, that is, if it is necessary to log in to the target application to view the related resource of the target application, it is first necessary to access the first page of the target application through the specific address. When accessing a page other than the first page (for example, the homepage of the target application), including the static resource, the related resource of the target application cannot be acquired, and the prompt page representing that the service resource cannot be prompted is displayed on the display device. When the server receives the access request for the target application that is not for the first page, the prompt page is displayed on the display device of the client, indicating that the service resource cannot be provided. Specifically, the prompt page may be a 404 page.

After the first page of the target application is accessed through the specific address and the authorization code is input, the server verifies the authorization code, and if the authorization code is input incorrectly, the verification fails. In this case, the resource of the target application cannot be displayed either, and the prompt page will be displayed on the display device of the client, indicating that the service resource cannot be provided.

In the method according to this embodiment, for the target application with the concealment function enabled, the first page must be accessed first, and the target application can be accessed only when the authorization code is successfully authenticated. In the case of direct access to the target application or the authorization code fails to be authenticated, the target application cannot be accessed. This method can prevent a possible attacker from detecting the directory of the target application through blasting scanning, thereby improving the security of the target application.

In some optional embodiments, after the authorization code is successfully authenticated, the address information of the initiator of the access request is set as the confidence address. In response to the authorization code being successfully authenticated, the service resource access method further includes the following step.

In S22, cache data returned by the server of the target application is received and stored, where the cache data includes the authorization code that is successfully authenticated.

After the user inputs the authorization code on the first page and submits it, the server verifies the authorization code. When the authorization code is successfully authenticated, the source IP that inputs the authorization code is added to the whitelist, indicating that it is a trusted IP, that is, the confidence address, and then jumps to the login page of the target application. The server creates a session identification, that is, a sessionID, for the authentication of the authorization code. The session identification is globally unique, and the cookie is encapsulated and returned to the client based on the session identification. The encapsulated cookie includes the session identification, the authorization code whose authorization is passed, etc., and the client saves the cookie locally. The cookie is the cache data returned by the server.

In some optional embodiments, after S22, the following step is further included.

In S23, if the access request for the first page is initiated again or an access request for the page of the related service resources of the target application is initiated, the login page of the target application is displayed, where the access request carries the cache data, the authorization code in the cache data carried in the access request is authenticated, and the confidence address in the cache data is consistent with the address information of the initiator.

For the user of the client who has accessed the target application, when accessing the first page again or directly accessing the target application, the server will first verify the source IP of the client (i.e. the address information of the initiator) to determine whether it is on the whitelist. When the source IP of the client is on the whitelist, it indicates that the address information of the client is the confidence address. In addition, the cache data carried in the access request initiated by the client will also be verified. The cache data stores the authorization code.

For the client device that has input the authorization code on the first page and has successfully authenticated, the cache data returned by the server is locally stored and the cache data includes the authorization code. After the server authenticates the authorization code in the cache data and determines that the address of the client is the confidence address, the login page of the target application will be directly displayed on the page of the client without authentication on the first page.

In the method according to this embodiment, for the client who accesses the target application or the first page again, it is necessary to determine whether the address information is the confidence address and whether the cache data carrying the authenticated authorization code is carried. When the verification is passed, the login page of the target application is directly displayed regardless of whether the client accesses the first page or the target application. Authorized users are verified by means of adding a whitelist, setting a cache address, session identification and the like, which can avoid affecting normal authorized users, will not change the usage habits of users, and improve the user experience.

Further, the method further includes the following steps.

In S24, displaying the first page in response to the access request for the first page being initiated again and either of current address information of the initiator being inconsistent with the confidence address or the authorization code in the cache data carried in the access request failing to be authenticated.

For the client who accesses the first page again, the authorization code in the cache data and the address information are verified. If the current address information of the initiator is inconsistent with the confidence address, it may be that the IP of the initiator changes, or the authorization code in the cache data fails to be authenticated, then the first page is displayed on the display device of the client, that is, the user is required to re-input the authorization code on the first page for re-authentication, and the target application can be accessed only after the authorization code is authenticated.

In S25, displaying a prompt page representing that the service resource cannot be provided in response to an access request for the page of the related service resources of the target application being initiated and either of the current address information of the initiator being inconsistent with the confidence address or the authorization code in the cache data carried in the access request failing to be authenticated.

For the client that directly initiates the access request to the page of the related service resources of the target application, the current address information of the initiator and the authorization code in the cache data are verified. If the current address information is inconsistent with the confidence address or the authorization code in the cache data fails to be authenticated, the prompt page representing that the service resource cannot be provided is directly displayed on the display device of the client. Specifically, the prompt page may be a 404 page. In this case, it will not jump to the first page, and the first page is not known to the outside world, and the first page will be displayed only when the first page is accessed.

In the method according to this embodiment, for the client who accesses the first page again, it is necessary to determine whether the current address information is the confidence address and whether the cache data carrying the authenticated authorization code is carried. When the verification fails, it jumps to the first page for the user to re-input the authorization code for authentication. For the user who directly accesses the target application, when the verification fails, the prompt page representing that the service resource cannot be provided is displayed. This method ensures the privacy of the first page, that is, only the user who is issued the specific address of the first page can be authenticated by inputting the authorization code on the first page, and then access the page of the related service resources of the target application, thereby avoiding the risk of the target application being scanned and further attacked by Internet attackers, without additional installation of software, reducing software management costs and security vulnerabilities and risks that may be introduced by installing software.

Figure 4:
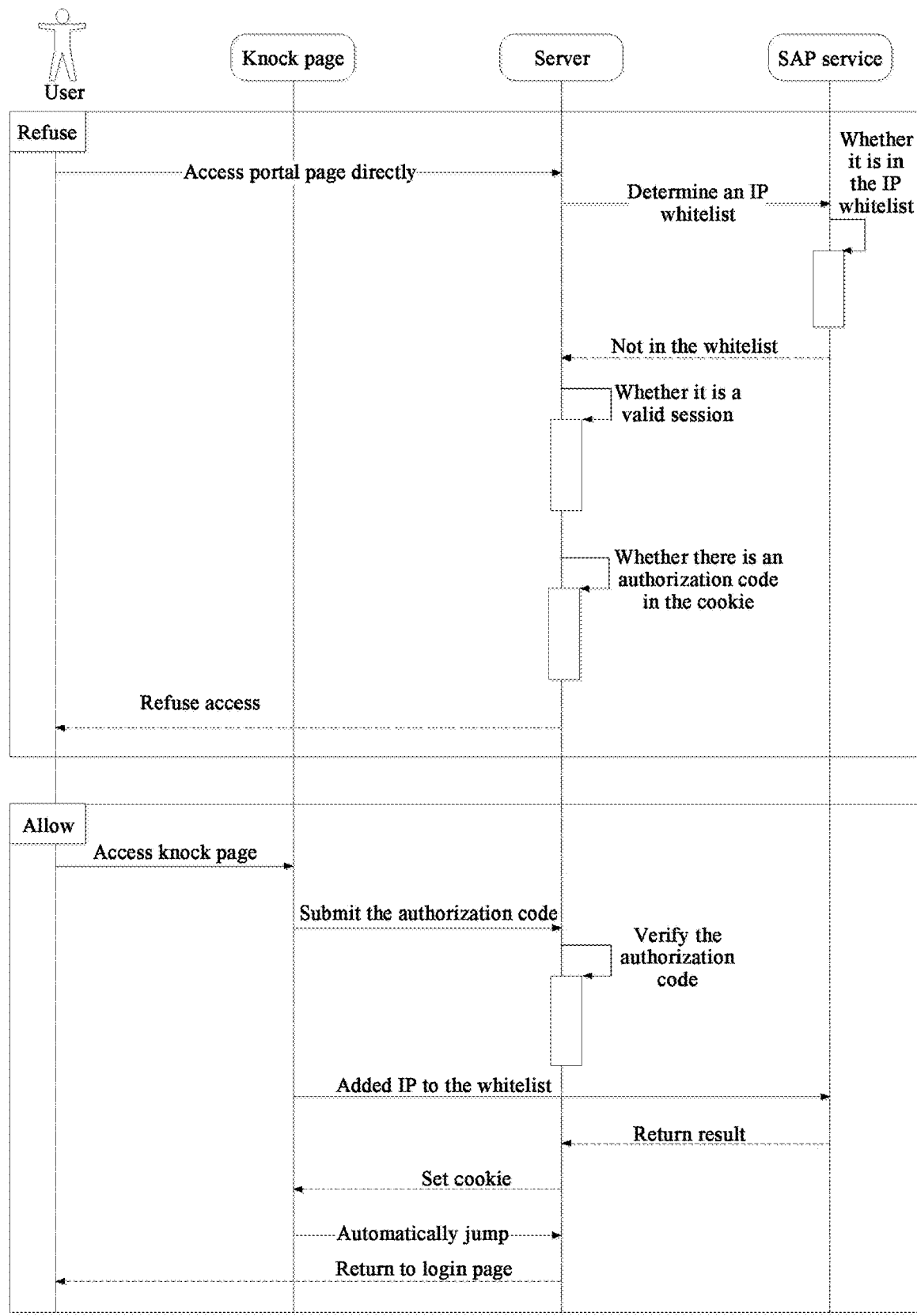
FIG. 4 is a schematic diagram of a scenario of a method for access control of service resources according to an embodiment of the present disclosure.

In some optional implementations, the service resource access method is shown in FIG. 4, and the method is implemented through a seven-layer application concealment service, and the knock page represents the first page. When the application enables the service concealment function, the Web application is not accessible by default, and an exclusive knock page of the application will be generated. The specific address is, for example, http://abc.yingyong.com/sc/qwerttsda, and the authorization code is r4sf. Only after the knock page is requested first, the application can be accessed.

After the user accesses the knock page and inputs the authorization code on the knock page, the server verifies the authorization code. After the verification is successful, the source IP of the client is added to the whitelist, and the cache data (cookie) with the authorization code is returned, and at the same time, the related page (for example, the login page) of the application is jumped to.

When the user directly accesses the application, it is determined whether the IP of the client used by the user is in the whitelist, whether the cache data in the initiated access request has the authorization code and whether there is a valid session. If the verification fails, the user is refused access and a 404 page is returned.

Figure 5:
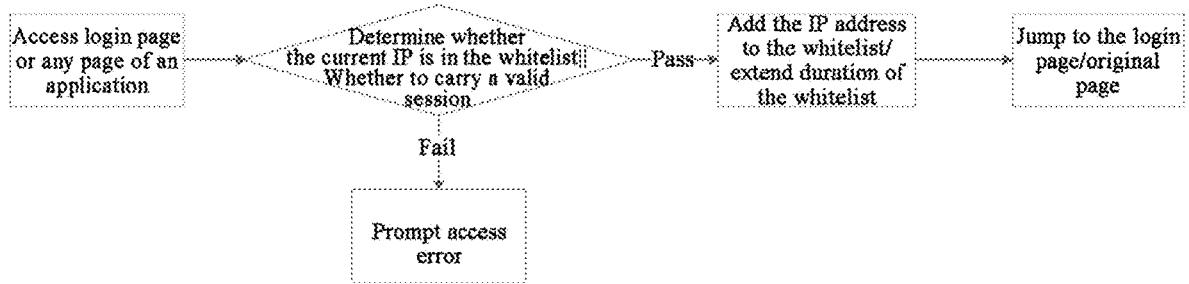
FIG. 5 is a schematic flowchart of a method for access control of service resources according to an embodiment of the present disclosure.

For the access request to access the related page of the application again, the processing flowchart is shown in FIG. 5. It is determined whether the current IP is in the whitelist or whether a valid session is carried. If the verification fails, it prompts that the access is wrong and displays a 404 page; if the verification is passed, the IP address is added to the whitelist or the duration of the IP address in the whitelist is extended, and at the same time, the access page is jumped to.

In the case of no authorization, accessing all page resources (including static resources) other than the knock page will uniformly return the 404 page, so that the attacker cannot detect which directories the application has through blasting scanning.

Figure 6:
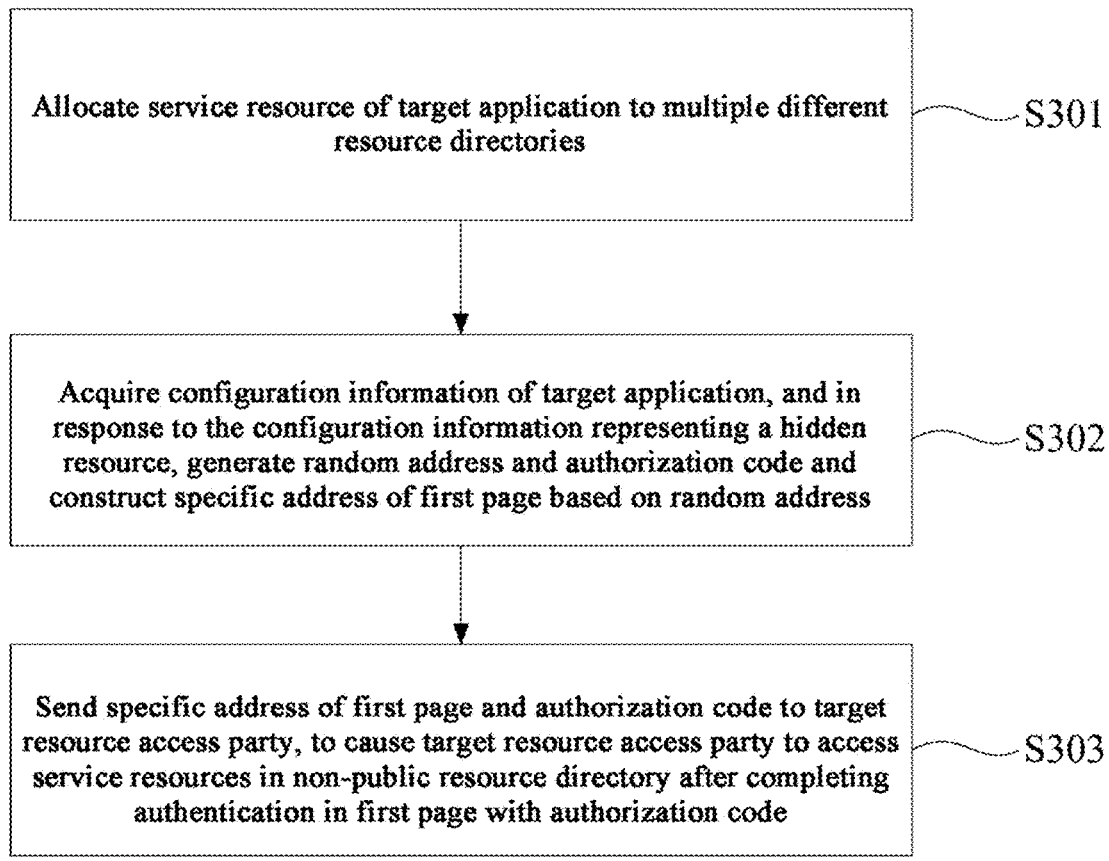
FIG. 6 is a schematic flowchart of a method for access control of service resources according to an embodiment of the present disclosure.

In this embodiment, a method for access control of service resources is provided, which is applied to a server. FIG. 6 is a flowchart of the method for access control of service resources according to an embodiment of the present disclosure. As shown in FIG. 6, the process includes the following steps.

In S301, service resources of a target application are allocated to multiple different resource directories.

The multiple different resource directories include a public resource directory and a non-public resource directory.

In this embodiment, a seven-layer application concealment service is deployed on the server, and the concealment service of the target application can be enabled as needed. When the user of the client needs to access the target application with the concealment service enabled, it is necessary to access the first page of the target application and input the authorization code, and the page of the related service resources of the target application can be accessed only after the verification is successful.

The server will separate the front-end data package of the application and allocate different service resources to different resource directories. The different resource targets may include a public resource directory and a non-public resource directory. The public resource directory stores single-page applications that do not need to be knocked, and the non-public resource directory stores single-page applications that need to be knocked. The public resource directory and the non-public resource directory are only types of directories, and the multiple different resource directories may also include other types of directories. The public resource directory also includes the related resource of the first page and the environment configuration resource of the target application.

For different configuration information, the generated configuration file has different access paths and access modes for the resources in the public resource directory and the non-public resource directory.

In S302, configuration information of the target application is acquired, and in a case where the configuration information represents a hidden resource, a random address and an authorization code are generated, and a specific address of the first page is constructed based on the random address.

The configuration information of the target application is used to characterize whether the target application is hidden, which may be set by an administrator. In the case where the configuration information represents the hidden resource, it indicates that the target application enables the service concealment, and accessing the target application that enables the service concealment first requires accessing the first page of the target application. First, a random address and a corresponding authorization code are generated to form the specific address of the first page. The random address may be 12 bits, and the form of the specific address may be "domain/sc/random address". The authorization code is used for inputting a number or letter on the page after accessing the first page, and the authorization code is authenticated after the authorization code is input.

In S303, the specific address of the first page and the authorization code are sent to a target resource access party, to cause the target resource access party to access the service resources in the non-public resource directory after completing authentication in the first page with the authorization code.

The target resource access party may be considered as a user who is authorized to access the target application after being authenticated on the first page. After the first page and the authorization code of the target application are generated, the specific address of the first page and the authorization code are sent to the target resource access party by email, SMS, etc. When the target resource access party needs to access the target application, it is necessary to access the first page through the specific address and input the correct authorization code on the first page to access the target application, thereby accessing the service resource in the non-public resource directory.

In the method according to this embodiment, the service resources of the target application are separated, and in the case where the configuration information represents the hidden resource, the random address and the authorization code are generated, so as to construct the specific address of the first page. The target resource access party can access the service resource in the non-public resource directory only after completing the authentication in the first page through the authorization code. In this method, the service resources of the target application are separated, which can ensure that after the application enables the concealment state, all resources can be hidden, and the resources can be accessed only after the authorization code is input in the first page and the verification is passed, thereby ensuring the security of the resources.

In some optional embodiments, S301 includes the following steps.

In S41, for any service resource of the target application, if the service resource is required to be accessed after being authenticated in the first page, the service resource is allocated to the non-public resource directory; if the service resource is not required to be accessed after being authenticated in the first page, the service resource is allocated to the public resource directory; wherein the public resource directory includes the first page.

The front-end package of the target application is separated, and different service resources are allocated to different resource directories. Specifically, the service resource that needs to be accessed after being authenticated in the first page is allocated to the non-public resource directory, and the service resource that is not required to be accessed after being authenticated in the first page is allocated to the public resource directory. The public resource directory also includes the related resource of the first page and the environment configuration-related resource of the target application.

When the target application enables different configuration information, the generated configuration file has different access paths corresponding to different types of resource directories.

In this embodiment, the front-end package of the target application is allocated to different types of resource directories, which facilitates the subsequent generation of corresponding access paths for different types of resource directories when different configuration information is enabled.

In some optional embodiments, the method further includes: generating a configuration file of the target application according to current configuration information of the target application, where the configuration file includes access paths of respective resource directories under the current configuration information.

The current configuration information of the target application may include enabling service concealment and disabling service concealment, and a corresponding configuration file may be generated according to different configuration information of the target application. When switching the configuration information of the target application, different configuration files may be generated through scripts. Since the service resources of the target application are allocated to multiple different resource directories, the access path of the public resource directory is usually the original access path, the access path of the non-public resource directory will change with the configuration information, and the access path of each type of resource is specified in the configuration file.

When the service concealment is not enabled, the resources in the public resource directory and the non-public resource directory are usually accessed according to the original path, which is equivalent to directly accessing all resources.

When the service concealment is enabled, the server will generate a corresponding configuration file in the back-end. In the configuration file, the access path of the public resource directory is usually the original access path, while the access path of the non-public resource directory needs to be determined by a specified manner (for example, a reverse proxy technology), thereby ensuring the security of the resource in the non-public resource directory in the concealment state.

The access paths under the current configuration information are determined as follows.

In S42, if the current configuration information represents a public resource, a first original access path of the public resource directory is identified, and a second original access path of the non-public resource directory is identified; the first original access path is determined as an access path of the public resource directory under the current configuration information, and the second original access path is determined as an access path of the non-public resource directory under the current configuration information.

The current configuration information representing the public resource indicates that the configuration information of the current target application is not concealed, and at this time, a configuration file of the target application will be generated. The configuration file stores access paths of the public resource directory and the non-public resource directory. The original path of the public resource directory is the first original access path, and the original path of the non-public resource directory is the second original access path. Under the public configuration information, the first original access path and the second original access path are used as the access paths of the public resource directory and the non-public resource directory respectively.

In S43, if the current configuration information represents a hidden resource, a third original access path of the public resource directory is identified, the third original access path is determined as an access path of the public resource directory under the current configuration information, and an access path of the non-public resource directory under the current configuration information is reverse proxied to the server of the target application.

The current configuration information representing the hidden resource indicates that the configuration information of the current target application is concealed, and at this time, a configuration file of the target application will be generated. The configuration file stores access paths of the public resource directory and the non-public resource directory. The original path of the public resource directory is the third original access path, and the third original access path is used as the access path of the public resource directory. The access path of the non-public resource directory under the current configuration information is reverse proxied to the server of the target application, that is, the non-public resource directory can be reverse proxied to the server (web_server) of the target application through the reverse proxy technology (proxy_pass). The server can query whether the authentication of the first page is passed through a specified interface, and if so, directly jump to the page of the non-public resource to be accessed, and if not, return to the 404 page. The switching of different configuration files can be completed by scripts.

In this embodiment, the access paths of the public resource directory and the non-public resource directory are generated according to different configuration information, and the resource in the non-public resource directory cannot be accessed directly, and must be authenticated after knocking. In the concealment mode, the access path of the non-public directory will be reverse proxied to the server of the target application, which is convenient for initiating the authentication on the first page and ensuring the security of the target application in the concealment mode.

In some optional embodiments, the method further includes the following steps.

In S51, in a case where the configuration information represents a public resource, only service resources in the public resource directory are hosted.

In S52, in a case where the configuration information represents a hidden resource, both the service resource in the public resource directory and the service resource in the non-public resource directory are hosted.

In the case where the configuration information represents the hidden resource, it indicates that the target application is in the service concealment state. Since nginx cannot directly judge session, all resources are hosted through gin. Since the first page needs to use the static resource, it also includes hosting the front-end static resource, and all front-end pages can be transferred to a specified port (for example, 7000 port).

After the concealment of the target application is enabled, the administration console will modify the nginx configuration to enable resource hosting.

In the case where the configuration information represents the public resource, it indicates that the target application is in the not-concealed state, and only the service resource in the public resource directory is hosted.

Specifically, the static file that is hosted by default may include a file (including the first page) under/public-pages. The static resource directory that is hosted only when the full service concealment is enabled may include an interface under the root path, such as/and/login; a static file under/web-static; a file under/multiple-pages, etc.

In this embodiment, a hosting mode for different configuration information is provided, which can automatically change the nginx configuration and reduce labor consumption.

In some optional embodiments, the service resource processing method further includes the following steps.

In S61, an authorization code submission interface and an authentication status query interface are configured for the target application, where the authorization code submission interface is used to acquire the authorization code input in the first page, and the authentication status query interface is used to feedback an authentication status in the first page.

The authorization code submission interface and the authentication status query interface are added for the target application. The authorization code submission interface is used to submit the authorization code in the first page, which may specifically be POST/api/knock.

The authentication status query interface is used to determine an authentication status of the authorization code in the first page, that is, the front end judges whether the authentication is currently completed to display different interfaces, which may specifically be GET/api/login/setting.

When the interface is blocked by knocking, an HTTP 404 error will be reported.

In S62, if the current configuration information represents a hidden resource, the hidden interface in the target application is allowed to be accessed only when the authentication status fed back by the authentication status query interface represents a success of the authentication.

The interfaces can be divided into two categories, one is an interface that can always be accessed, and the other is an interface that can be accessed only after knocking. The interface that can always be accessed may include some specific interfaces or services, which means that there is no need to have an additional interface for verifying the authorization code in the first page, behind the service concealment, to verify the authorization code,/api/knock.

If the current configuration information represents the hidden resource, it indicates that the target application enables the service concealment, and the interface that can be accessed only after knocking refers to that in the concealment state, the hidden interface can be accessed only when the authentication status fed back by the authentication status query interface represents a success of the authentication. The hidden interface may include all other interfaces.

The server may also be deployed with a configuration interface for setting service concealment (POST/api/config/knock) and a configuration interface for obtaining service concealment (GET/api/config/knock). The configuration items of the server may include a switch, a random address, an authorization code and an IP whitelist. The switch is used to enable or disable the service concealment of the target application. The random address may be 12 bits and is used to form the specific address of the first page, and the specific address may be "domain/sc/random address". The authorization code may be four bits, and only after the input authorization code is successfully authenticated, the knock can be considered successful. The IP whitelist refers to that when the IP address in the whitelist accesses the target application or the first page again, there is no need to knock, and the input is the IP address or the network segment, and whether there is an intersection in the IPs in the whitelist will not be verified.

In this embodiment, an apparatus for access control of service resources is further provided. The apparatus is used to implement the above embodiments and preferred implementations, which will not be repeated here. As used below, the term "module" can implement a combination of software and/or hardware for a predetermined function. Although the apparatus described in the following embodiments is preferably implemented in software, implementation in hardware, or a combination of software and hardware is also possible and contemplated.

Figure 7:
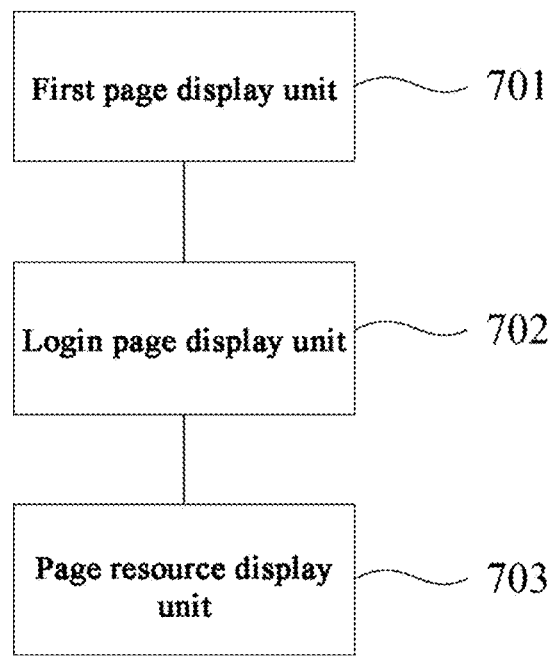
FIG. 7 is a schematic diagram of an access control apparatus according to an embodiment of the present disclosure.

This embodiment provides service resources access apparatus, as shown in FIG. 7, including: a first page display unit 701, configured to display a first page of a target application in response to an access request for the first page initiated, where the first page includes a verification control, and the specific address of the first page includes a random path generated randomly; a login page display unit 702, configured to receive an authorization code input in the verification control, and display a login page of the target application in response to the authorization code being successfully authenticated; and a page resource display unit 703, configured to receive authentication information input in the login page, and display a page of related service resources of the target application in response to the authentication information being successfully authenticated.

In some optional embodiments, the apparatus further includes: a prompt page display unit, configured to initiate a resource access request for the target application in response to no access request for the first page being initiated or the authorization code failing to be authenticated, and display a prompt page representing that the service resources cannot be provided in response to the resource access request.

In some optional embodiments, after the authorization code is successfully authenticated, the address information of the initiator of the access request is set as the confidence address.

The login page display unit 702 includes: a cache data reception subunit, configured to receive and store cache data returned by the server of the target application, where the cache data includes the authorization code that is successfully authenticated.

In some optional embodiments, the apparatus further includes: a second login page display unit, configured to display the login page of the target application if the access request for the first page being initiated again or an access request for the page of the related service resources of the target application is initiated, where the access request carries the cache data, the authorization code in the cache data carried in the access request is authenticated, and the confidence address in the cache data is consistent with the address information of the initiator.

In some optional embodiments, the second login page display unit includes: a first page display subunit, configured to display the first page in response to the access request for the first page being initiated again and either of current address information of the initiator being inconsistent with the confidence address or the authorization code in the cache data carried in the access request failing to be authenticated; and a second prompt page display subunit, configured to display a prompt page representing that the service resource cannot be provided if an access request for the page of the related service resources of the target application is initiated and either of current address information of the initiator is inconsistent with the confidence address or the authorization code in the cache data carried in the access request fails to be authenticated.

In some optional embodiments, the apparatus further includes: a resource allocating unit, configured to allocate service resources of the target application to multiple different resource directories, where the multiple different resource directories include a public resource directory and a non-public resource directory; an address construction unit, configured to acquire configuration information of the target application, generate a random address and an authorization code in a case where the configuration information represents a hidden resource, and construct a specific address of the first page based on the random address; and a sending unit, configured to send the specific address of the first page and the authorization code to a target resource access party, to cause the target resource access party to access the service resources in the non-public resource directory after completing authentication in the first page with the authorization code.

In some optional embodiments, the resource allocating unit includes: a resource allocating subunit, configured to allocate any service resource of the target application to the non-public resource directory if the service resource is required to be accessed after being authenticated in the first page; and allocate the service resource to the public resource directory if the service resource is not required to be accessed after being authenticated in the first page, where the public resource directory includes the first page.

In some optional embodiments, the apparatus further includes: a configuration file generation unit, configured to generate a configuration file of the target application according to current configuration information of the target application, where the configuration file includes access paths of respective resource directories under the current configuration information. The configuration file generation unit includes: a first generation subunit, configured to identify a first original access path of the public resource directory and a second original access path of the non-public resource directory if the current configuration information represents a public resource; determine the first original access path as an access path of the public resource directory under the current configuration information, and determine the second original access path as an access path of the non-public resource directory under the current configuration information; and a second generation subunit, configured to identify a third original access path of the public resource directory and determine the third original access path as an access path of the public resource directory under the current configuration information, and reverse proxy an access path of the non-public resource directory under the current configuration information to the server of the target application if the current configuration information represents a hidden resource.

In some optional embodiments, the apparatus further includes: a first hosting unit, configured to host only service resources in the public resource directory in a case where the configuration information represents a public resource; and a second hosting unit, configured to host both the service resource in the public resource directory and service resources in the non-public resource directory in a case where the configuration information represents a hidden resource.

In some optional embodiments, the apparatus further includes: a first interface configuration unit, configured to configure an authorization code submission interface and an authentication status query interface for the target application, where the authorization code submission interface is used to acquire the authorization code input in the first page, and the authentication status query interface is used to feedback an authentication status in the first page; and a first interface configuration unit, configured to allow a hidden interface in the target application to be accessed only if the current configuration information represents a hidden resource and the authentication status fed back by the authentication status query interface represents a success of the authentication.

Further functional description of the above modules and units is the same as that of the corresponding embodiments described above, and will not be repeated here.

Figure 8:
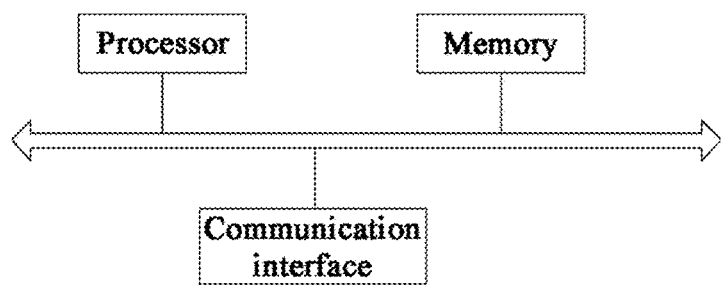
FIG. 8 is a schematic diagram of an electronic device according to an embodiment of the present disclosure.

Referring to FIG. 8, it is a schematic diagram of an electronic device according to an embodiment of the present disclosure. The electronic device includes a processor and a memory, where the memory is configured to store a computer program, and the computer program, when executed by the processor, implements the method according to the above.

The processor may be a central processing unit (Central Processing Unit, CPU). The processor may also be other general-purpose processors, digital signal processors (Digital Signal Processor, DSP), application specific integrated circuits (Application Specific Integrated Circuit, ASIC), field programmable gate arrays (Field-Programmable Gate Array, FPGA) or other programmable logic devices, discrete gate or transistor logic devices, discrete hardware components, etc., or a combination of the above types of chips.

As a non-transitory computer-readable storage medium, the memory can be used to store a non-transitory software program, a non-transitory computer-executable program and modules, such as program instructions/modules corresponding to the methods in the implementations of the present disclosure. The processor executes various functional applications and data processing of the processor by running the non-transitory software program, instructions and modules stored in the memory, and thus implementing the methods according to the method implementations as described above.

The memory may include a program storage area and a data storage area, where the program storage area may store an operating system and an application program required for at least one function; and the data storage area may store data created by the processor, etc. In addition, the memory may include a high-speed random access memory, and may also include a non-transitory memory, such as at least one magnetic disk storage device, a flash memory device, or other non-transitory solid-state storage devices. In some implementations, the memory may optionally include a memory remotely provided relative to the processor, and these remote memories may be connected to the processor through a network. Examples of the above network include, but are not limited to, the Internet, an intranet, a local area network, a mobile communication network and a combination thereof.

One implementation of the present disclosure further provides a computer-readable storage medium, configured to store a computer program, where the computer program when executed by a processor, implements the method according to the above.

Although the implementations of the present disclosure have been described with reference to the drawings, those skilled in the art may make various modifications and variations without departing from the spirit and scope of the present disclosure, and such modifications and variations all fall within the scope defined by the appended claims.

I claim:

1. A method for access control of service resources, comprising:
   displaying a first page of a target application in response to an access request for the first page initiated through a specific address, wherein the first page comprises a verification control, and the specific address comprises a random path generated randomly;
   receiving an authorization code input in the verification control, and displaying a login page of the target application in response to the authorization code being successfully authenticated;
   receiving authentication information input in the login page, and displaying a page of related service resources of the target application in response to the authentication information being successfully authenticated; and
   wherein the method further comprises before displaying the first page of the target application:
   allocating service resources of the target application to multiple different resource directories, wherein the multiple different resource directories comprise a public resource directory and a non-public resource directory;
   acquiring configuration information of the target application, and in response to the configuration information representing a hidden resource, generating a random address and an authorization code and constructing a specific address of the first page based on the random address; and
   sending the specific address of the first page and the authorization code to a target resource access party, to cause the target resource access party to access the service resources in the non-public resource directory after completing authentication in the first page with the authorization code.

2. The method according to claim 1, further comprising:
   initiating a resource access request for the target application in response to no access request for the first page being initiated or the authorization code failing to be authenticated, and displaying a prompt page representing that the service resources cannot be provided in response to the resource access request.

3. The method according to claim 1, wherein after the authorization code is successfully authenticated, address information of an initiator of the access request is set as a confidence address; and
   wherein the method further comprises: in response to the authorization code being successfully authenticated, receiving and storing cache data returned by a server of the target application, wherein the cache data comprises the authorization code that is successfully authenticated.

4. The method according to claim 3, further comprising:
   displaying the login page of the target application in response to the access request for the first page being initiated again or an access request for the page of the related service resources of the target application being initiated, wherein the access request carries the cache data, the authorization code in the cache data carried in the access request is authenticated, and the confidence address in the cache data is consistent with the address information of the initiator.

5. The method according to claim 1, further comprising:
   displaying the first page in response to the access request for the first page being initiated again and either of current address information of an initiator being inconsistent with the confidence address or the authorization code in the cache data carried in the access request failing to be authenticated; and
   displaying a prompt page representing that the service resource cannot be provided in response to an access request for the page of the related service resources of the target application being initiated and either of the current address information of the initiator being inconsistent with the confidence address or the authorization code in the cache data carried in the access request failing to be authenticated.

6. The method according to claim 1, wherein allocating the service resources of the target application to the multiple different resource directories comprises:
   for any service resource of the target application, allocating the service resource to the non-public resource directory in response to the service resource being required to be accessed after being authenticated in the first page;
   allocating the service resource to the public resource directory in response to the service resource not being required to be accessed after being authenticated in the first page, wherein the public resource directory comprises the first page.

7. The method according to claim 1, further comprising:
   generating a configuration file of the target application according to current configuration information of the target application, wherein the configuration file comprises access paths of respective resource directories under the current configuration information; wherein the access paths under the current configuration information are determined by:
   identifying a first original access path of the public resource directory and a second original access path of the non-public resource directory in response to the current configuration information representing a public resource;
   determining the first original access path as an access path of the public resource directory under the current configuration information, and determining the second original access path as an access path of the non-public resource directory under the current configuration information; and identifying a third original access path of the public resource directory, determining the third original access path as the access path of the public resource directory under the current configuration information, and reverse proxying the access path of the non-public resource directory under the current configuration information to a server of the target application, in response to the current configuration information representing a hidden resource.

8. The method according to claim 1, further comprising:
hosting only service resources in the public resource directory in response to the configuration information representing a public resource; and
hosting both the service resources in the public resource directory and the service resources in the non-public resource directory in response to the configuration information representing a hidden resource.

9. The method according to claim 1, further comprising:
configuring for the target application an authorization code submission interface and an authentication status query interface, wherein the authorization code submission interface is used to acquire an authorization code input in the first page, and the authentication status query interface is used to feedback an authentication status in the first page;
wherein in response to the current configuration information representing the hidden resource, the hidden interface in the target application is allowed to be accessed only in accordance with a determination that the authentication status fed back by the authentication status query interface represents a success of the authentication.

10. An electronic device, wherein the electronic device comprises a processor and a memory, wherein the memory is configured to store a computer program, and the computer program, when executed by the processor, causes the electronic device to:
display a first page of a target application in response to an access request for the first page initiated through a specific address, wherein the first page comprises a verification control, and the specific address comprises a random path generated randomly;
receive an authorization code input in the verification control, and display a login page of the target application in response to the authorization code being successfully authenticated; and
receive authentication information input in the login page, and display a page of related service resources of the target application in response to the authentication information being successfully authenticated;
wherein the computer program, when executed by the processor, further causes the electronic device to, before displaying the first page of the target application:
allocate service resources of the target application to multiple different resource directories, wherein the multiple different resource directories comprise a public resource directory and a non-public resource directory;
acquire configuration information of the target application, and in response to the configuration information representing a hidden resource, generate a random address and an authorization code and construct a specific address of the first page based on the random address; and
send the specific address of the first page and the authorization code to a target resource access party, to cause the target resource access party to access the service resources in the non-public resource directory after completing authentication in the first page with the authorization code.

11. The electronic device according to claim 10, wherein the computer program, when executed by the processor, further causes the electronic device to:
initiate a resource access request for the target application in response to no access request for the first page being initiated or the authorization code failing to be authenticated, and display a prompt page representing that the service resources cannot be provided in response to the resource access request.

12. The electronic device according to claim 10, wherein after the authorization code is successfully authenticated, address information of an initiator of the access request is set as a confidence address; and
wherein the computer program, when executed by the processor, further causes the electronic device to: in response to the authorization code being successfully authenticated, receive and store cache data returned by a server of the target application, wherein the cache data comprises the authorization code that is successfully authenticated.

13. The electronic device according to claim 12, wherein the computer program, when executed by the processor, further causes the electronic device to:
display the login page of the target application in response to the access request for the first page being initiated again or an access request for the page of the related service resources of the target application being initiated, wherein the access request carries the cache data, the authorization code in the cache data carried in the access request is authenticated, and the confidence address in the cache data is consistent with the address information of the initiator.

14. The electronic device according to claim 10, wherein the computer program, when executed by the processor, further causes the electronic device to:
display the first page in response to the access request for the first page being initiated again and either of current address information of an initiator being inconsistent with the confidence address or the authorization code in the cache data carried in the access request failing to be authenticated; and
display a prompt page representing that the service resource cannot be provided in response to an access request for the page of the related service resources of the target application being initiated and either of the current address information of the initiator being inconsistent with the confidence address or the authorization code in the cache data carried in the access request failing to be authenticated.

15. The electronic device according to claim 10, wherein the computer program causing the electronic device to allocate the service resources of the target application to the multiple different resource directories causes the electronic device to:
for any service resource of the target application, allocate the service resource to the non-public resource directory in response to the service resource being required to be accessed after being authenticated in the first page;
allocate the service resource to the public resource directory in response to the service resource not being required to be accessed after being authenticated in the first page, wherein the public resource directory comprises the first page.

16. The electronic device according to claim 10, wherein the computer program, when executed by the processor, further causes the electronic device to:
generate a configuration file of the target application according to current configuration information of the target application, wherein the configuration file comprises access paths of respective resource directories under the current configuration information; wherein the access paths under the current configuration information are determined by:
identifying a first original access path of the public resource directory and a second original access path of the non-public resource directory in response to the current configuration information representing a public resource;
determining the first original access path as an access path of the public resource directory under the current configuration information, and determining the second original access path as an access path of the non-public resource directory under the current configuration information; and
identifying a third original access path of the public resource directory, determining the third original access path as the access path of the public resource directory under the current configuration information, and reverse proxying the access path of the non-public resource directory under the current configuration information to a server of the target application, in response to the current configuration information representing a hidden resource.

17. The electronic device according to claim 10, wherein the computer program, when executed by the processor, further causes the electronic device to:
host only service resources in the public resource directory in response to the configuration information representing a public resource; and
host both the service resources in the public resource directory and the service resources in the non-public resource directory in response to the configuration information representing a hidden resource.

18. The electronic device according to claim 10, wherein the computer program, when executed by the processor, further causes the electronic device to:
configure for the target application an authorization code submission interface and an authentication status query interface, wherein the authorization code submission interface is used to acquire an authorization code input in the first page, and the authentication status query interface is used to feedback an authentication status in the first page;
wherein in response to the current configuration information representing the hidden resource, the hidden interface in the target application is allowed to be accessed only in accordance with a determination that the authentication status fed back by the authentication status query interface represents a success of the authentication.

19. A non-transitory computer-readable storage medium, wherein the computer-readable storage medium is configured to store a computer program, and the computer program, when executed by a processor, causes the processor to:
display a first page of a target application in response to an access request for the first page initiated through a specific address, wherein the first page comprises a verification control, and the specific address comprises a random path generated randomly;
receive an authorization code input in the verification control, and display a login page of the target application in response to the authorization code being successfully authenticated; and
receive authentication information input in the login page, and display a page of related service resources of the target application in response to the authentication information being successfully authenticated;
wherein the computer program, when executed by the processor, further causes the processor to, before displaying the first page of the target application:
allocate service resources of the target application to multiple different resource directories, wherein the multiple different resource directories comprise a public resource directory and a non-public resource directory;
acquire configuration information of the target application, and in response to the configuration information representing a hidden resource, generate a random address and an authorization code and construct a specific address of the first page based on the random address; and
send the specific address of the first page and the authorization code to a target resource access party, to cause the target resource access party to access the service resources in the non-public resource directory after completing authentication in the first page with the authorization code.

20. The non-transitory computer-readable storage medium according to claim 19, wherein the computer program, when executed by the processor, further causes the processor to:
initiate a resource access request for the target application in response to no access request for the first page being initiated or the authorization code failing to be authenticated, and display a prompt page representing that the service resources cannot be provided in response to the resource access request.

* * * * *